(12) United States Patent
Luzin

(10) Patent No.: US 12,271,825 B2
(45) Date of Patent: Apr. 8, 2025

(54) PREDICTIVE SYSTEM FOR SEMICONDUCTOR MANUFACTURING USING GENERATIVE LARGE LANGUAGE MODELS

(71) Applicant: LYNCEUS SAS, Paris (FR)

(72) Inventor: Vladislav Luzin, Pardes Hanna Karkur (IL)

(73) Assignee: LYNCEUS SAS, Paris (FR)

( * ) Notice: Subject to any disclaimer, the term of this patent is extended or adjusted under 35 U.S.C. 154(b) by 0 days.

(21) Appl. No.: 18/241,725

(22) Filed: Sep. 1, 2023

(65) Prior Publication Data

US 2025/0077882 A1     Mar. 6, 2025

(51) Int. Cl.
| | |
|---|---|
| *G06N 3/09* | (2023.01) |
| *G06F 40/40* | (2020.01) |
| *G06N 3/04* | (2023.01) |
| *G06N 3/0455* | (2023.01) |
| *G06N 3/0475* | (2023.01) |
| *G06N 3/092* | (2023.01) |

(52) U.S. Cl.
CPC .............. *G06N 3/092* (2023.01); *G06F 40/40* (2020.01); *G06N 3/0455* (2023.01); *G06N 3/0475* (2023.01)

(58) Field of Classification Search
CPC ........ G06N 3/045; G06N 3/0455; G06N 3/04; G06N 3/07; G06N 3/0475; G06N 3/08; G06N 3/092; G06N 20/00; G06F 40/40
See application file for complete search history.

(56) References Cited

U.S. PATENT DOCUMENTS

| | | | |
|---|---|---|---|
| 10,430,719 B2 | 10/2019 | David | |
| 2006/0252348 A1 | 11/2006 | Lin et al. | |
| 2007/0100487 A1 | 5/2007 | Cheng et al. | |
| 2008/0275586 A1 | 11/2008 | Ko et al. | |
| 2022/0147819 A1* | 5/2022 | Lawrence | ............. G06F 18/211 |
| 2023/0126800 A1 | 4/2023 | Chen et al. | |

OTHER PUBLICATIONS

May et al., "Applying Natural Language Processing in Manufacturing", 2022, Procedia CIRP, vol. 115, pp. 184-189 (Year: 2022).*
Rathore, "Future of Textile: Sustainable Manufacturing & Prediction via ChatGPT", Feb. 7, 2023, Eduzone: International Peer Reviewed/Refereed Multidisciplinary Journal (EIPRM), vol. 12 No. 1 (2023): vol. 12, Issue 1, pp. 52-62 (Year: 2023).*
Brunson, "Securing Data Privacy through Responsible In-House AI", Jul. 12, 2023, LinkedIn (Year: 2023).*

(Continued)

*Primary Examiner* — Van C Mang
(74) *Attorney, Agent, or Firm* — David H. Judson

(57) ABSTRACT

A method for process control in association with a production system. The method leverages a large language model (LLM) that has been trained or fine-tuned on production data in a manner that avoids or minimizes use of numerical sensor data. In particular, during training, historical sensor data is received. In lieu of using the historical sensor data to train the model directly, the data is first encoded into a grammar-based sequence of characters before it is applied to train or fine-tune the model.

15 Claims, 11 Drawing Sheets

(56) References Cited

OTHER PUBLICATIONS

Giles et al., "Noisy Time Series Prediction using Recurrent Neural networks and Grammatical Inference", Jul. 2001, Machine Learning 44, pp. 161-183 (Year: 2001).*
Loh et al., "A parallel algorithm for robust fault detection in semiconductor manufacturing processes", Mar. 28, 2014, Cluster Computing 17, pp. 643-651 (Year: 2014).*
Wang et al., "A Self-Learning and Online Algorithm for Time Series Anomaly Detection, with Application in CPU manufacturing", Oct. 24, 2016, CIKM '16: Proceedings of the 25th ACM International Conference on Information and Knowledge Management, pp. 1823-1832 (Year: 2016).*
Kim et al., "DeepNAP: Deep Neural anomaly prediction in a semiconductor fab", Aug. 2018, Information Sciences, vols. 457-458, pp. 1-11 (Year: 2018).*
Park et al., "A Reinforcement Learning Approach to Robust Scheduling of Semiconductor Manufacturing Facilities", Dec. 31, 2019, IEEE Transactions on Automation and Science and Engineering, vol. 17, Issue 3, pp. 1420-1431 (Year: 2019).*
Ezukwoke et al., "Leveraging Pre-trained Models for Failure Analysis Triplets Generation", Oct. 31, 2022, arXiv:2210.17497, pp. 1-33 (Year: 2022).*
Yu et al., "Temporal Data Meets LLM—Explainable Financial Time Series Forecasting", Jun. 19, 2023, arXiv:2306.11025, pp. 1-13 (Year: 2023).*
Thakur, "An Introduction to Training LLMs Using Reinforcement Learning From Human Feedback (RLHF)", Jan. 31, 2023, Weights & Biases, pp. 1-6 (Year: 2023).*
Pulijala, "Crafting Competitive Edge by Training LLMs with In-House Data", Aug. 24, 2023, Predera, pp. 1-7 (Year: 2023).*
Lin et al., "A Symbolic Representation of Time Series, with Implications for Streaming Algorithms," DMKD' 03, Jun. 13, 2003.
"Symbolic Aggregate approximation," https://jmotif.github.io/sax-vsm_site/morea/algorithm/SAX.html, Oct. 27, 2016.
PCT/IB2024/000476, International Search Report and Written Opinion, Jan. 31, 2025.
Stiefmeier, et al., "Gestures are Strings: Efficient Online Gesture Spotting and Classification using String Matching," Proceedings 2nd International Conference on Body Area Networks, Jan. 1, 2007.
Haresamudram, et al., "Towards Learning Discrete Representations via Self-Supervision for Wearables-Based Human Activity Recognition," Arxiv.org, Cornell University Library, Jun. 1, 2023.
De Miguel-Rodriguez, et al. "A Recursive Bateson-Inspired Model for the Generation of Semantic Formal Concepts from Spatial Sensory Data," Arxiv.org, Cornell University Library, Jul. 16, 2023.

* cited by examiner

| Temp °C | Pressure kPa |
|---|---|
| -40 | 51.64 |
| -36 | 63.32 |
| -32 | 77.04 |
| -28 | 93.05 |
| -26 | 101.99 |
| -24 | 111.60 |
| -22 | 121.92 |
| -20 | 132.99 |
| -18 | 144.83 |
| -16 | 157.48 |
| -12 | 185.40 |
| -8 | 217.04 |
| -4 | 252.74 |
| 0 | 292.82 |
| 4 | 337.65 |
| 8 | 387.56 |
| 12 | 442.94 |
| 16 | 504.16 |
| 20 | 571.60 |
| 24 | 645.66 |
| 26 | 685.30 |
| 28 | 726.75 |
| 30 | 770.06 |
| 32 | 815.28 |
| 34 | 862.47 |
| 36 | 911.68 |
| 38 | 962.98 |
| 40 | 1016.4 |
| 42 | 1072.0 |
| 44 | 1129.9 |

PREDICTIVE SYSTEM FOR SEMICONDUCTOR MANUFACTURING USING GENERATIVE LARGE LANGUAGE MODELS

BACKGROUND

Technical Field

This application relates generally to quality assurance testing for products, such as semiconductor wafers that are produced in manufacturing facilities.

Background of the Related Art

As manufacturing processes grow more complex and sophisticated, production defects become both more common and harder to predict. Indeed, traditional process control techniques, such as Statistical Process Control (SPC), are now too limited to reliably anticipate defects, as they cannot follow multiple machine parameters simultaneously, and they rely on linear underlying models that are not predictive for many use cases. They also rely on manual set-up of thresholds, thereby complicating use in practice. In addition, production data is often fragmented and unbalanced due to the instability inherent to manufacturing processes. Different products, machines or even drifts on the same machine produce heterogeneous and inconsistent data. As a consequence, and despite the need for more advanced anticipation solutions, the penetration of Artificial Intelligence (AI)-based solutions for quality prediction remains somewhat limited. This is especially true for more advanced AI techniques, such as neural networks, which perform better in modeling complex systems but require vast amounts of balanced data. As a consequence, and despite the tremendous progress being made in modeling techniques, manufacturers have limited options over the implementation of a fully predictive management of their operations, at a time when their profitability is increasingly impacted by this lack of anticipation.

The current state-of-the-art application of AI and machine learning (ML) in the semiconductor manufacturing space consists primarily of standard neural networks or statistical-based algorithms. In these approaches, sensor data from Fault Detection and Classification (FDC) and Statistical Process Control (SPC) is processed to extract important features, which are then used to train the relevant model/algorithms. While these techniques have advantages, every use case requires separate work to identify relevant features and to choose the correct algorithm or model architecture, thus impacting the ability to scale the AI/ML in the manufacturing environment or to transfer the benefit across different equipment or processes. Moreover, typically there is no connection between AI/ML models that cover different parts of the semiconductor manufacturing process, thus dictating the need for deep involvement from human personal.

Generative artificial intelligence is artificial intelligence capable of generating text, images, or other media in response to prompts. Generative AI models learn the patterns and structure of their input training data by applying neural network machine learning techniques, and then generate new data that has similar characteristics. A large language model (LLM) is a language model generative AI characterized by emergent properties enabled by its large size. A typical LLM is built with artificial neural networks that are pre-trained using self-supervised learning and semi-supervised learning, and a model of this type may have tens of millions to billions of weights. As language models, a model of this type works by taking an input text and repeatedly predicting a next token or word. Known generative LLMs (GLLMs) include OpenAI GPT-4, LLaMA, and many others.

Given appropriate training data, a GLLM can predict values in a given text. While application of models of this type could provide advantages in semiconductor manufacturing applications, a problem arises because a large amount of data generated by a semiconductor machine and that might otherwise be useful for training the model is sensor data that is not textual. Existing approaches to GLLM training treat numerals similar to other words, usually using distributions over a fixed vocabulary. This approach maps all unseen numerals to a same (unknown) type and ignores the continuous property of the numbers. Research has shown that numerals have higher out-of-vocabulary rates than other words, thus impacting the performance of GLLMs when dealing with numerical attributes. This lack of numeracy hinders a GLLM from performing well on tasks requiring numeracy. In addition, often it is the case that semiconductor production data is very sensitive proprietary information (e.g., specific configuration parameters of a deep trench tool may be critical to increasing yield and thus provide a critical competitive advantage) that, were it exposed, could lead to significant material and brand name recognition losses. The need for privacy-preserving training in this context thus also is necessary.

Although GLLM-support of semiconductor manufacturing techniques could provide significant advantages, existing training and inferencing techniques are inadequate to address these and other deficiencies.

BRIEF SUMMARY

The subject matter addresses the above-described deficiencies by a mechanism that encodes numerical sensor data into a non-numerical format to facilitate training of a large language model for use in a semiconductor manufacturing operating environment; this same encoding technique is also used to create input data to the trained model to facilitate inferencing.

According to one aspect, a method for process control in association with a production system is described. The method leverages a large language model (LLM) that has been trained on production data, but in a manner that avoids or minimizes use of numerical sensor data. In particular, during training, a large amount of training data is received. Typically, this data is of various types including historical sensor data, text data of various types, and, optionally, human-generated additional data. The historical sensor data typically includes process data, metrology data, maintenance data, and the like, most of which is numerical. The text data may be received from various data sources, such as tool manuals, operation procedure documentation, end-of-shift reports, incident reports, process engineering frequently asked questions (FAQs), best practices documentation, on-boarding documentation, data schemas, and the like. The human-generated additional data may be of various types, such as human intelligence including, without limitation, a bespoke set of questions and answers created to fine-tune a response capability of the model for a particular customer or user. According to this disclosure, and in lieu of using the historical sensor data to train the model directly, that data is first encoded into a grammar-based sequence of characters, i.e., text, before it is applied to train the model.

According to a further aspect, and assuming the large language model has been trained at least in part on the historical sensor data that has been processed through the encoding scheme, information associated with a current state of the production system is received. The information comprises sensor data, at least some of which is numerical. Using the same encoding scheme that was applied to the historical sensor data during the training phase, the numerical sensor data is encoded into a grammar-based sequence of characters. Then, using at least the grammar-based sequence of characters in lieu of the numerical sensor data, inferencing against the large language model (LLM) is then performed to provide a prediction. As noted, the large language model is a model that has been trained on production data associated with the production system, the production data comprising grammar-based sequences of characters, text data, and optionally the additional data, and wherein the grammar-based sequences of characters have been derived from historical sensor data. Thereafter, the prediction is applied to control a workflow associated with the production system.

The particular encoding scheme used to transform the process data for training purposes and that is also applied to the sensor data that is to be input to the model may vary. A representative scheme is a symbolic partitioning algorithm.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which.

DETAILED DESCRIPTION

Figure 1:
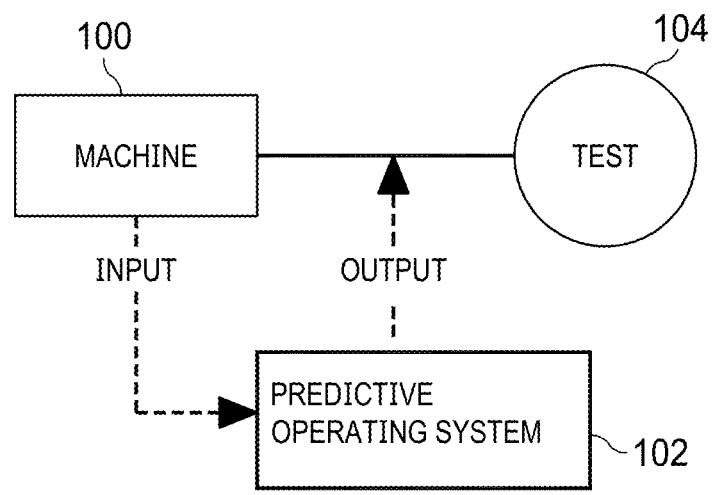
FIG. 1 depicts a known machine learning-assisted prediction system for a semiconductor manufacturing machine.

FIG. 1 depicts a simplified representation of the basic operation of a real-time prediction method and system in which the techniques of this disclosure may be practiced. As shown, production data obtained from a production machine 100 is provided as input to predictive operating system 102. Representative input data comprises machine parameters, maintenance data, characteristics of the product (e.g., a semiconductor wafer) that is being processed by the machine 100, and the like. The input data received from the machine is processed by the predictive operating system 102, which hosts and executes a machine learning model (or an ensemble of models) that has been trained to provide quality assurance predictions. Based on the received input data, the model provides an output, e.g., a predicted result of one or more quality test(s) that are anticipated to be carried out in the production environment. Using this basic approach, operators of the machine obtain valuable and timely product quality predictions that may then be leveraged within a manufacturing facility to enable these operators to act more proactively, e.g., by making machine and other process adjustments, thereby avoiding future product defects and improving yield. In this manner, the predictive operating system 102 facilitates and improves upon various quality assurance tasks such as, without limitation, data driven sampling (calculating a probability of defect for each unit produced indicating which units to test), real-time monitoring (monitoring machine performance in real-time and issuing alerts in case of anomaly), root cause analysis (identifying patterns in production data that can explain recurring defects), and the like, all in real-time and with minimal disruption.

Model Training

In a representative embodiment, the model used by the predictive operating system is trained off-line, i.e., prior to its use in providing real-time predictions. Typically, the model used for prediction is associated with a given machine, although the model may itself leverage knowledge (e.g., about some other machine of the same type) obtained via transfer learning. Transfer learning (use of adjacent data to extract information from similar machines) is valuable in the context where the amount of production data from the machine being modeled presently is sparse.

Generalizing, the predictive operating system receives various types of production data. During the typical production of a wafer on a given machine, a number of process variables are sampled by the machine. For example, and for a particular wafer being produced in the machine, variables may include temperature, pressure within the machine, gas flow rate, and many more. During the model training phase, the production data (FIG. 1, "input data") received by the predictive operating system for a given machine may include a data set (e.g., in the form of an input vector) comprising a large set of process variables and the associated measured values that were obtained in situ as the product was processed within the machine. This data thus represents the conditions that existed within the machine at the time of the sampling. In addition, the production data also includes additional data representing the results of quality tests (e.g., resistance tests, critical dimensions test, breakdown voltage tests, etc.) on some percentage of the products that have been processed through the machine. Typically, in an overall production data set received by the operating system the percentage of products (e.g., wafers) that have been subjected to quality testing is small (e.g., 5%). Thus, the production data often includes both (i) labeled data, representing the machine parameters etc. measured inside the machine during the processing, together with the associated quality test results, and (ii) unlabeled data, representing the machine parameters, etc. measured inside the machine during the processing but wherein no quality test results are provided. The labeled data provides a balance to the unlabeled data, thereby improving the predictions available from the model.

For training, one or more tasks are executed in accordance with a multi-task learning paradigm. Multi-task learning generally consists of simultaneously training a neural network on several tasks. One task uses the production data (or some portion thereof) to train the model to predict a result of an anticipated end-of-line electrical test for the product when processing is completed. Another task uses the production (or some portion thereof) to predict a result of an anticipated in-line test, e.g., a test taken at the output of the given machine. Preferably, the end-of-line and in-line predictions are done at the same time. In this embodiment, the modeling enables a determination regarding whether the in-line test itself is good at predicting an anticipated failure at the end-of-line; stated more generally, the technique enables the operator to understand how a particular in-line test actually correlates with the end-of-line test. Anther task uses the production data (or some portion thereof) to identify a feature set that identifies relationships between one or more of the variables reflected in the input vector; in this manner, the input vector (e.g., comprising ten (10) distinct process variables) is compressed into a dimensionally-reduced vector (e.g., comprising just five (5) process variable relationships) that the model learns are predictive. These tasks may be carried out to provide multi-task learning.

Figure 2:
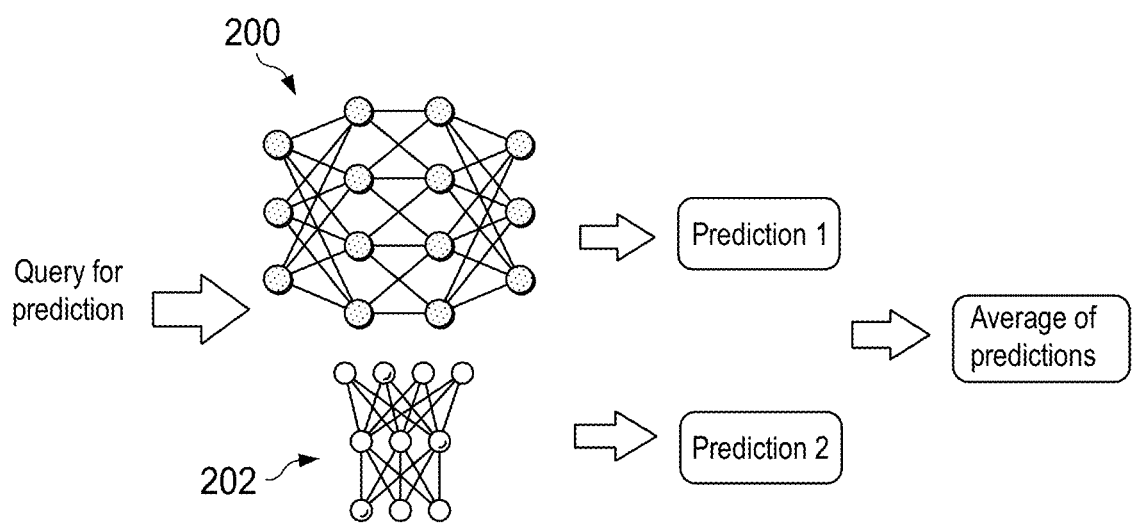
FIG. 2 depicts an ensemble of models being used to provide prediction(s) associated with a production machine.

In a typical solution, and with respect to a given production machine, there may be an ensemble of models that are trained using the above-described techniques, or combinations thereof. This is depicted in FIG. 2, which shows an ensemble 200 comprising a first model (in this case, a deep neural network (DNN)) 200 that has been trained using multi-task learning, and a second model 202 that has been trained via transfer learning. Each of the models within the ensemble may have a different architecture, but preferably all use the historical production data for training. Thus, for example, one model may be a deep neural network (DNN), while another model leverages some other machine learning technique (e.g., Random Forest, KNN, etc.).

Formally, a NN is a function g: X→Y, where X is an input space, and Y is an output space representing a categorical set in a classification setting (or a real number in a regression setting). For a sample x that is an element of X, $g(x)=f_L(f_{L-1}(\ldots((f_1(x))))$. Each $f_i$ represents a layer, and $f_L$ is the last output layer. The last output layer creates a mapping from a hidden space to the output space (class labels) through a softmax function that outputs a vector of real numbers in the range [0, 1] that add up to 1. The output of the softmax function is a probability distribution of input x over C different possible output classes. Other machine learning algorithms that can be leveraged include, without limitation, vector autoregressive modeling (e.g., Autoregressive Integrated Moving Average (ARIMA)), state space modeling (e.g., using a Kalman filter), a Hidden Markov Model (HMM), recurrent neural network (RNN) modeling, RNN with long short-term memory (LSTM), Random Forests, Generalized Linear Models, Extreme Gradient Boosting, Extreme Random Trees, Generative Pre-Trained Transformers, and others. By applying these modeling techniques, new types of features are extracted, e.g., as follows: model parameters (e.g., coefficients for dynamics, noise variance, etc.), latent states, and predicted values for a next couple of observation periods.

Figure 3:
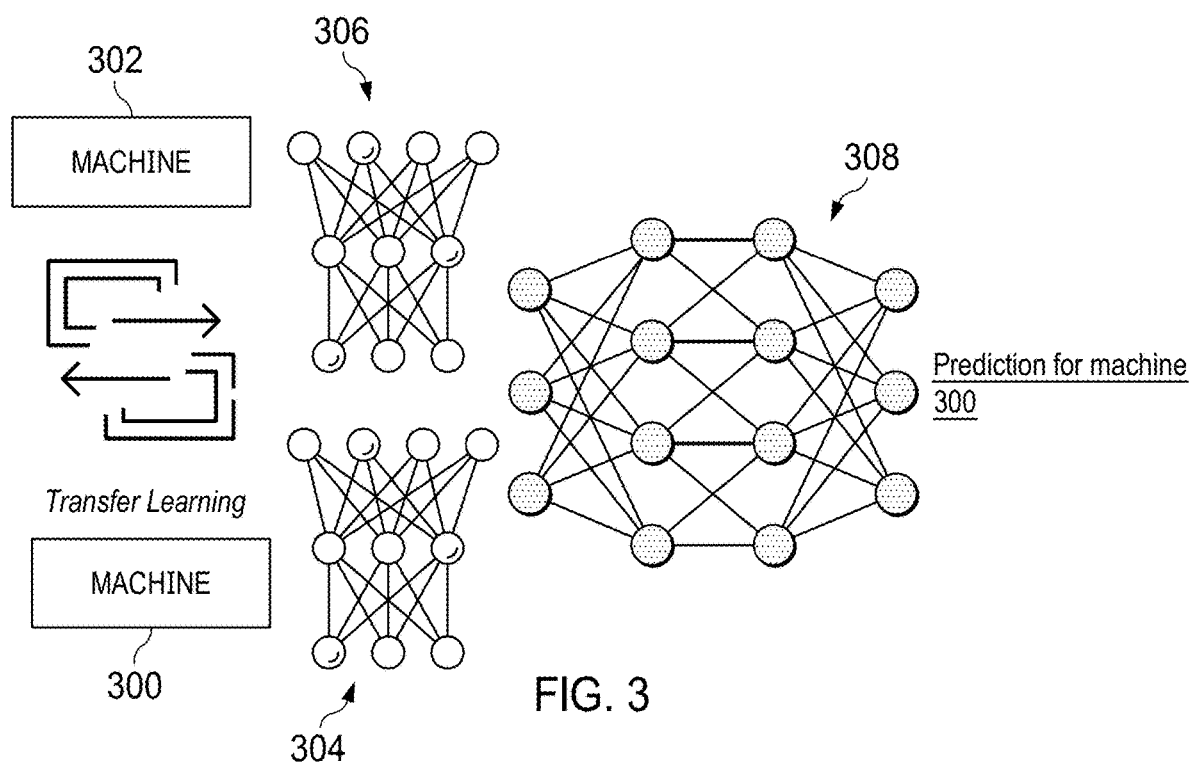
FIG. 3 depicts how transfer learning is used in association with a deep neural network to train a production machine-specific quality assurance predictive algorithm.

In addition, the training also preferably leverages transfer learning. In machine learning, transfer learning is the notion of storing knowledge gained while solving one problem and applying it to a different but related problem. Here, the knowledge gained while solving one problem comprises a model that has been developed for another machine of the same type as the given machine for which the current model is being trained. The two machines do the same processing within the context of the production environment, but there may be only sparse data available for the production machine for which the current model is being trained. In this embodiment, and with reference to FIG. 3, there are two production machines 300 and 302 of the same type. The target model is being developed for the current production machine 300, but it is assumed that the production data for this machine is sparse (although this is not a requirement). In this context, the production data from the second machine 302 is used to train a first model 304, and whatever production data is available for the current machine 300 is used to train a second model 306. The first and second models 304 and 306 and are then positioned as sub-networks in front of a deep neural network (DNN) 308 that will be trained to make predictions for the current machine of interest. The respective production data used during the training of the first and second models is then re-applied, and the DNN is trained. In this manner, the knowledge obtained from the second machine 302 is transferred to the model used to generate predictions for the current machine 300. In this example, the DNN represents a common representation of the machines 300 and 302, while the sub-networks represent machine-specific models.

The transfer learning technique is part of a broader class of techniques usually referred to as "domain transfer." Other strategies for domain transfer, such as those involving generative adversarial networks (GAN), generative pre-trained transformers, and techniques of style transfer, may also be used.

Figure 4:
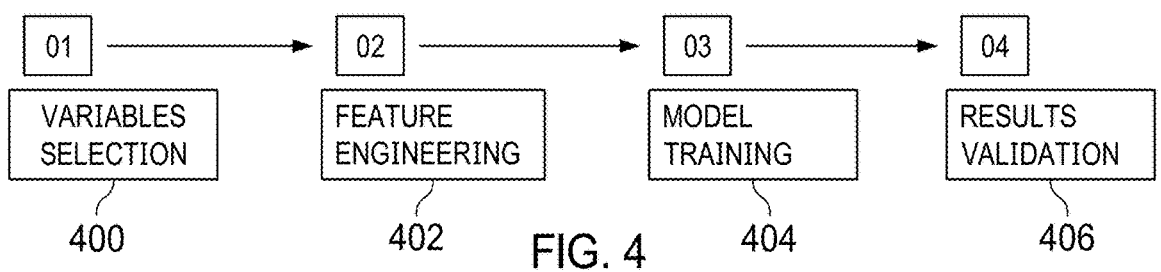
FIG. 4 depicts a generalized modeling methodology for use in or in association with a predictive operating system.

The modeling techniques described above provide for a generalized modeling methodology, which is now described. With reference to FIG. 4, the methodology begins with a variable selection phase 400, namely, the selection of one or more variables that are deemed representative of a process to be modeled. Often, the variable selection is based on or otherwise leverages domain expertise (e.g., for a particular machine). Variable selection may also be informed from physics-based, failure mode analysis with respect to the process being modeled. Thereafter, the methodology leverages a feature engineering phase 402 by which, for one or more of the variables selected, informative data is isolated while noise eliminated or reduced, once again with respect to the process specifications. Following the feature engineering phase, a model training phase 404 is carried out, e.g., using the multi-task and transfer learning techniques to provide increased robustness. In particular, and as described herein, this phase involves finding a best architecture and model parameters, and training the model with constraints to push robustness (e.g., via transfer learning). After model training, a results validation phase 406 is implemented to validate predictions, e.g., against actual measurements and electrical test results. This phase typically involves recreating the production conditions (not a randomly-extracted test set but, rather, one that reflects real life conditions), and preferably using a most recent part data set for testing.

To deploy a solution on a production line (e.g., in a fab), the predictive algorithm is trained on the historical production data that typically includes the process parameters, the results of quality tests, etc. Once the model (or model ensemble) is trained, it is deployed into production. Typically, deployment involves two (2) communications channels (as shown in FIG. 1), a first channel from a database (usually located on-premises) and that provides process data in real-time or substantially real-time so that the predictive operating system; the production data may be provided from the database, or the predictive operating system can query that database in real-time. A second communications channel is provided from the predictive operating system to the production system to enable sharing of the prediction(s). A given prediction may be coarse- or fine-granted (e.g., even for each unit produced). In one embodiment, the production system is a semiconductor manufacturing execution system (MES), but this is not a requirement. The particular interface provided by the production system may vary. Further, there is no restriction on the type of response that the production system may take in response to receipt of a prediction.

The nature of the prediction may vary depending on the production machine for which the model (or model ensemble) has been trained. For example, for a plasma etching machine, the prediction may be of a deep trench sidewall angle value, or the dimensions of an etch. To provide a more concrete example, the algorithm may predict simultaneously the value of critical dimensions of the etch and the value/failure of corresponding end-of-line probe tests. For a chemical vapor deposition (CVD) machine, the prediction may be of a wafer resistance parameter. For example, the algorithm may predict simultaneously the value of sheet resistivity (RS) and breakdown voltage oxide (BVox), and the value/failure of corresponding end of line electrical probe tests. For a machine that performs chemical mechanical planarization (CMP), the prediction may be whether a given wafer will exhibit normal polish classification or an under/over classification. For example, the algorithm may classify simultaneously wafer polish and predict the value/failure of corresponding end-of-line probe tests. Other predictions for other types of machines (e.g., an ion implantation machine) are likewise provided. Typically, electrical tests are performed at the end-of-line, but predictions about these EOL tests can also be influenced by predictions associated with in-line physical tests. Thus, a particular prediction regarding an in-line test may also be useful in predicting a particular expected EOL outcome. The above-described examples are not intended to be limiting.

In one example implementation, the model or model ensemble is trained in a cloud or other network-accessible compute environment, and thereafter the model is instantiated and run as a binary on computing resources within the physical production environment. The model may be instantiated in a container-type environment (e.g., a Docker image) and physically delivered to and hosted within the local production environment. In an alternative, both the training (model production) and real-time prediction are done remotely from the production environment. In another embodiment, both the training and real-time prediction occur on-premises. Typically, a hybrid deployment approach is used.

The model or model ensemble is periodically re-trained using historical data, e.g., once per month.

The techniques as have been described have significant advantages. They provide optimal and stable predictive performance in any type of production environments, and are able to model complex systems (the production machines) reliably, and in a scalable, highly-available manner. Predictions are robust, even where data is limited, as the use of transfer learning in particular enables the learning to leverage similar sources of data (e.g., from machines of the same type). Further, the approach seamlessly integrates readily into the production environment (with no ramp-up required) and maintains accurate and timely performance predictions even as changes are made in the production process. The high predictive performance is carried out without requiring changes to the production system or testing protocols, and irrespective of the density or sparsity of the production itself that is made available to the system. A typical prediction is simple to absorb and make actionable. For each unit and in real-time, engineers within the production environment know if a particular unit is or is not defective. The approach gives manufacturers visibility at every step of their manufacturing process at scale as soon as the model is deployed, enabling both significant yield improvements and cost savings. By leveraging deep and transfer learning, often together, the development and deployment of advanced models is enabled, even for limited and unbalanced data. Deep learning as has been described enables the system to model the non-linear systems (such as machines), extracting features and generalizing to establish complex relationships between and among multiple parameters represented in the production data. Transfer learning optimizes the training of the deep learning model by allowing for the use of similar sources of data to model the target dataset. Concretely, if it is desired to predict defects on a given product processed by a given machine, the system uses data relative to other products and other machines to complete this task. Transfer learning is quite valuable in modeling sparse production data by lowering data requirement to achieve high predictive performance on a given use case through the use of adjacent data sources, and by enabling stable predictive performance over time by supporting changes in manufacturing process (such as machine mismatch, drift, or introduction of new products). Combining deep and transfer learning enables quality prediction, concretely enabling the deployment of neural networks on production data and thereby empowering manufacturers with the most performant models available.

As noted above, the nature of the performance prediction(s) that are generated by the modeling approach may vary. They include, without limitation, in-line yield (the results of in-line quality tests), electrical test yield (e.g., the results of end-of-line quality tests), end yield (the results of final quality tests, e.g., post packaging), integration tests (the results of integration tests, e.g., for a chip as part of a larger component), field performance tests (e.g., longevity, product returns, expected versus real performance, etc.), and the like.

EXAMPLES

In a first example use case, the production machine is a Centura® Etch system manufactured by Applied Materials, Inc. of Santa Clara, California. In this example, the process variables that were selected are chamber pressure, throttle valve position, RF hours, bias power, source power, $O_2$ flow, HBr flow, cathode temperature, wall temperature, and convection pressure. The model architecture implemented is an attention-based artificial neural network. This architecture is a Deep Neural Network (DNN), and the output is obtained by passing the input through a sequence of processing layers. The computation in the layers in characterized by the following: every layer has an attention-based module for the pre-processing of the input; and every layer shares a part of the parameters with other layers to reduce overfitting. The processing in every layer is divided into two main steps, namely, an input filtering step, and a feature-transformer step. The input filtering step is the attention-based mechanism; this operation analyzes the input and filters-out non-relevant input features. In feature-transformation, the remaining features are transformed/processed and the output is sent to the next layer. Every feature-transformer is actually constituted by a small neural network. In this example, the attention-based artificial neural network has fifteen (15) layers and is pre-trained on unlabeled data. In particular, during the training phase multi-task learning is applied to predict critical dimensions for several product types with the same model. Further, data augmentation is used to boost the model training. The data augmentation uses unlabeled data. e.g., untested wafers for which there is input data but no critical dimension measurements. The trained model provides a prediction with a reliability score, together with a feature importance analysis that explains which input variables drive the prediction. The real-time prediction(s) provided are then used as input to control one or more automation systems used in the semiconductor production environment. Representative automation systems include automated material handling systems, alerting systems, and various Advanced Process Control (APC) techniques and technologies implemented within the fab. How a particular prediction generated is used for control purposes depends on the machine and the particular production process. Thus, for example, in certain cases the prediction is used to initiate an interdiction, which stops the machine or otherwise interrupts some processing operation so that additional wafers are not loaded, all while necessary parameter tuning or machine maintenance is carried out. In an alternative, the machine processing continues but the prediction enables one or more of the parameters (e.g., the process variables identified above) to be tuned dynamically, e.g., via the APC mechanisms. In another example, the prediction is used to drive back-end notification or alarm systems. Generalizing, the techniques herein real-time prediction(s) that are then integrated into the existing production machine workflow, preferably with the prediction(s) driving the back-end workflow or other tooling changes in an automated manner, thereby improving the underlying process control systems within the fab.

In the above example scenario, the modeling approach was found to have enabled a 90% reduction in average time to detect etch-related faults, and the approach enabled the user to reduce the frequency of critical dimension measurements that were previously required, and to monitor quality through virtual testing.

In a second example use case, the production machine is a lithography machine, and the process variables are exposure dose, throughput, beam alignment parameters, and wafer positioning coordinates. The model architecture was again an attention-based artificial neural network of the type described above. The training phase included multi-task learning (predicting litho critical dimensions for several technologies with the same model), and data augmentation to boost model training, once again using unlabeled data such as untested wafers for which there is input data but no litho critical dimension measurement(s). As implemented, the prediction returned included a reliability score, together with a feature importance analysis. This approach was found to have enabled a 70+% reduction in litho critical dimension sampling frequency, and it enabled the user to spot early wafers to be reworked. The approach can be expanded to use post-litho CVD prediction for subsequent etching process parameter tuning.

The above examples are representative of the methodology, but they are not intended to be limiting.

Generative Large Language Model (LLM) Support

With the above as background, the techniques of this disclosure are now described.

According to this disclosure, a generative large language model is utilized to facilitate predictive analytics in a semiconductor manufacturing operating environment, such as a semiconductor fabrication facility (or "fab"). Representative operating environments of this type have been described above. In an example embodiment, the GLLM is a pre-trained large language model, and this model is then fine-tuned in the manner that is now described. The notion of being pre-trained refers to the fact that (by virtue of its pre-training) the model already understands a grammar structure.

In accordance with the approach herein, and in lieu of fine-tuning the pre-trained model by the addition of numeric-based production data (such as sensor data having a high degree of precision), data of this type is first encoded into a character format that is consistent with the grammar structure that is already recognized by the GLLM. A representative encoding scheme for this purpose is a symbolic partitioning algorithm, e.g., symbolic aggregate approximation (SAX). By encoding the numeric-based production data in this manner, the GLLM is fine-tuned (during training), with the resulting fine-tuned model then being used for inferencing. Prior to inferencing against any input that includes numeric-based production data, that data is likewise encoded into the character format. Information returned from the inferencing is in the character format and so is then decoded by again applying the algorithm.

Figure 5:
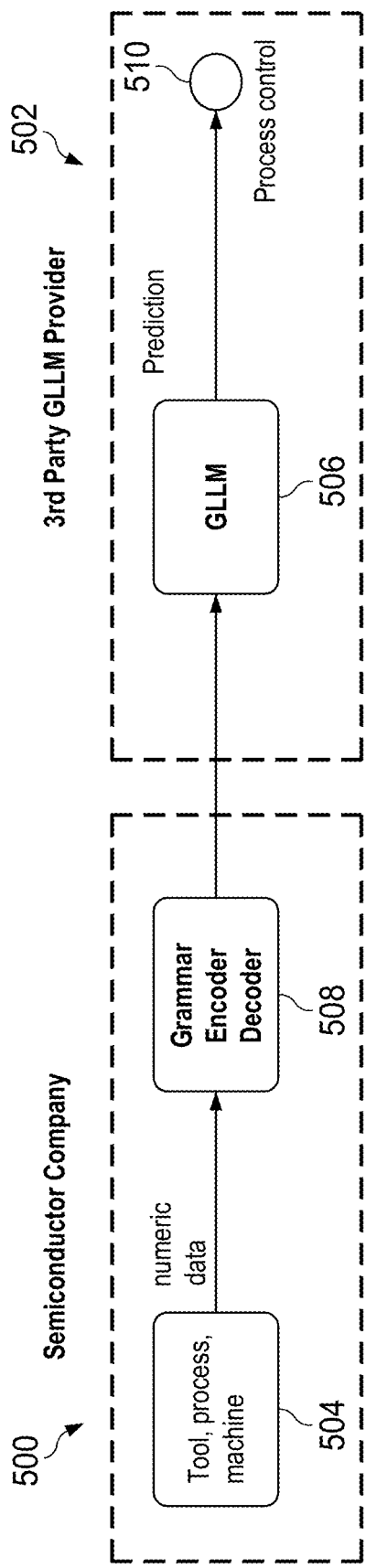
FIG. 5 depicts a representative operating environment wherein the techniques of this disclosure are implemented.

FIG. 5 depicts a typical operating scenario. To facilitate privacy-preserving training and inferencing, preferably the "client" side of an operation involves a semiconductor manufacturing operator 500 (e.g., as run by a semiconductor production entity), and a distinct third party GLLM provider 502 on a "server" side. The operator 500 comprises a production machine or process 504 for which a prediction is desired, and the provider 502 provides the generative large language model 506. As noted above, the model may be pre-trained. As also depicted, preferably the environment of the operator 500 hosts an encoder/decoder function 508 that obfuscates the operator's numerical process data and enables recovery of numeric data from predictions provided by the GLLM. Typically, the encoding/decoding function is implemented in software, as a set of computer program instructions, which are executed in one or more hardware processors or virtual machines. The GLLM 506 is hosted on a computing platform or other cloud-accessible computing systems, and the output prediction generated facilitates a process control 510 (the control itself typically is implemented within the operating environment 500 as depicted in FIG. 1). This bifurcated hosting facilitates privacy-preserving training and inferencing using the model, as grammar encoding/decoding rules are enforced on the client side, thereby obfuscating the sensor (or other production) data, while the training and inferencing is performed on privacy-preserving inputs on the "server" side. While the above-described bifurcated client-server implementation provides significant advantages, it is not required, as the GLLM may be hosted on-premises, the encoding/decoding function may be run "as-a-service" by the provider 502 or another entity, or other such implementation variations.

Figure 6:
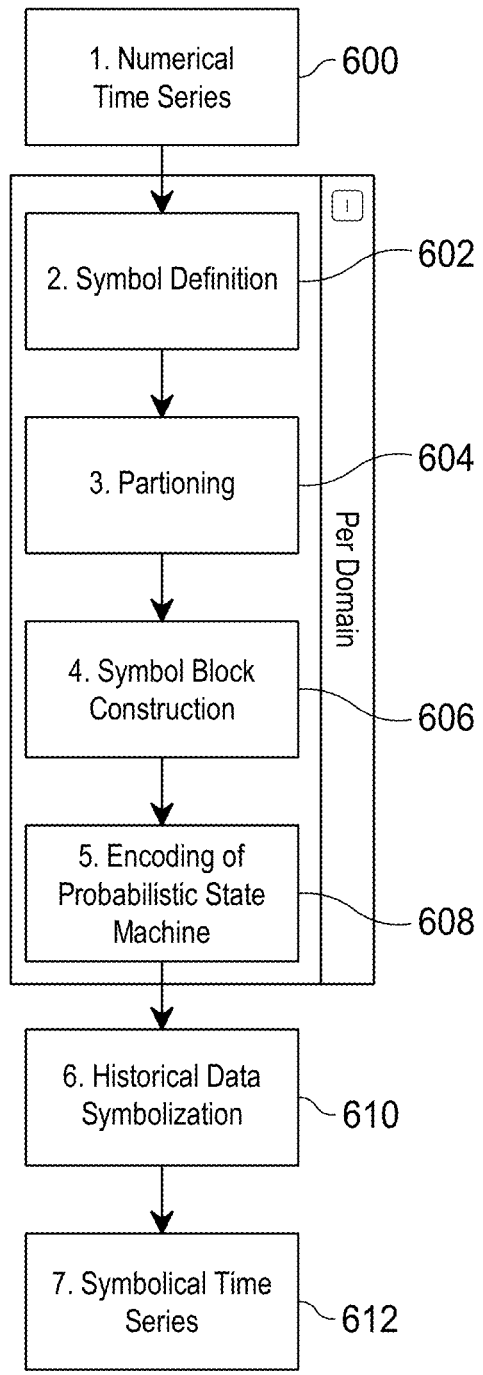
FIG. 6 depicts a symbolization process flow according to this disclosure to convert a numerical time series into a grammar-based symbol block corpus to facilitate sensor-to-grammar encoding.

The encoding of numerical representations, e.g., into an alphabet-based sequence, allows the generative large language model to clearly represent scale, precision, domain, and temporality of attributes, as well as to differentiate those attributes more easily. Typically, sensor data has very high precision, often with ten or more significant digits to the right of the decimal point, and such data is obtained as tabular data sets. Sensor data of a specific tool or a particular process often comprises numbers that are in a very limited range, and are output from the tool or process as a numerical time series. FIG. 6 depicts a representative encoding technique that is then implemented with respect to such inputs according to this disclosure during a training phase. The process begins at step 600 by obtaining/retrieving historical time-series data, typically from a particular tool/process. The next several steps 602, 604, 606 and 608 are then carried out on a per domain basis. In particular, and for each domain in the time-series, the following steps are taken. At step 602, the symbols (alphabet) to be used are defined. In an example embodiment, the total number of symbols (alphabet size) is bounded by a real value range of a particular sensor (or sensor type). The alphabet size may be defined in one or more ways, e.g., empirically, by using an information loss measure (e.g., RMSE, Shannon entropy excess, or the like), or by applying domain knowledge. After defining the symbols at step 602, step 604 defines a set of partitioning locations for the defined symbols. The goal of this operation is to define the partition locations so that a particular symbol sequence retains a temporal transition behavior embedded in the time-series signal. Techniques that may be used to define symbol partition locations include maximum entropy partitioning (MEP), uniform space (linear) partitioning, frequency dynamic interval class, symbolic aggregate approximation (SAX), k-means partitioning, normal cumulative distribution function (NCDF), and the like. The process then continues at step 606 to construct symbol blocks (words). Symbol blocks represent meaningful temporal patterns (i.e., location partitioning of the time series), and several techniques may be used for this purpose including, e.g., MEP, SAX, the others listed above. The symbol blocks thus represent a grammar, and this grammar thus is associated to the time-series obtained from the sensor data of interest. At step 608, the grammar is encoded, preferably as a probabilistic state machine. As noted, steps 602, 604, 606 and 608 are performed on a per-domain basis. At step 610, numerals (the numerical data) in a training (or testing) data set are converted into the symbolic representation(s). At step 612, and to complete the process, the symbolized data set (representing the time series) is then stored/saved as a symbol block corpus. This completes the encoding. This corpus also is useful to reconstruct the numerical data, and such reconstruction corresponds to the decoder function.

It should be appreciated that the reconstructed data provided by the decoding is an approximation due to inherent information loss in the symbolic representation. This approximation, however, suffices for the semiconductor use case where, typically, the system is mostly interested in knowing if the use case is within a control window.

Figure 7:
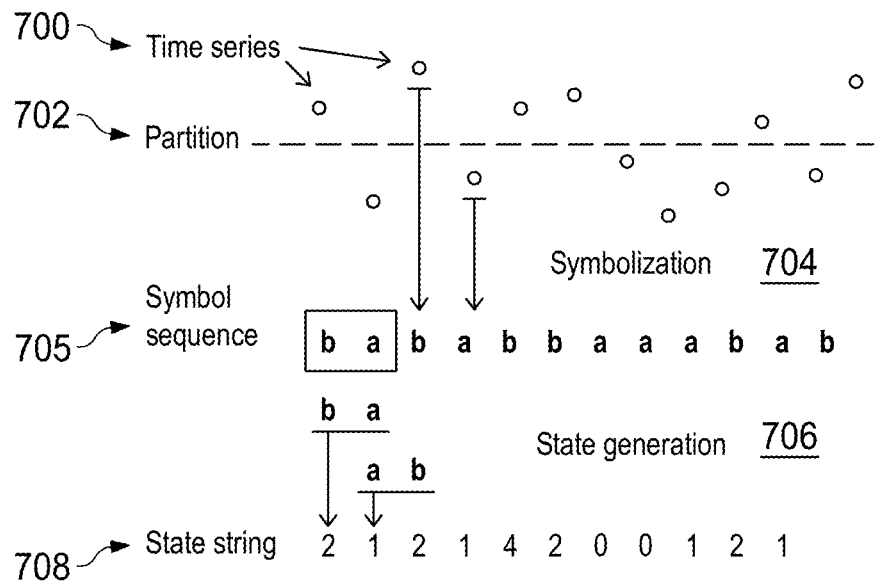
FIG. 7 depicts an example of the symbolization process flow as applied to a temperature data time series.

FIG. 7 depicts an example of the above-described encoder/decoder function. As depicted, and by applying the process flow of FIG. 6, the time series 700 (e.g., temperature sensor data) is partitioned by partition 702, which in this example is at 32° Fahrenheit (representing the freezing point of water). Given a representative alphabet size of 2, the symbolization 704 maps higher values (>32° F.) to symbol b, and lower values (<32° F.) to symbol a. Thereafter, and with respect to a symbol sequence 705, a state generation 706 operation generates symbol blocks (words) in order to represent meaningful patterns (i.e., pattern ba means water becomes ice, and pattern ab means ice becomes water). A state string 708 then represents states in a probabilistic deterministic state machine (a finite state automata).

Figure 8:
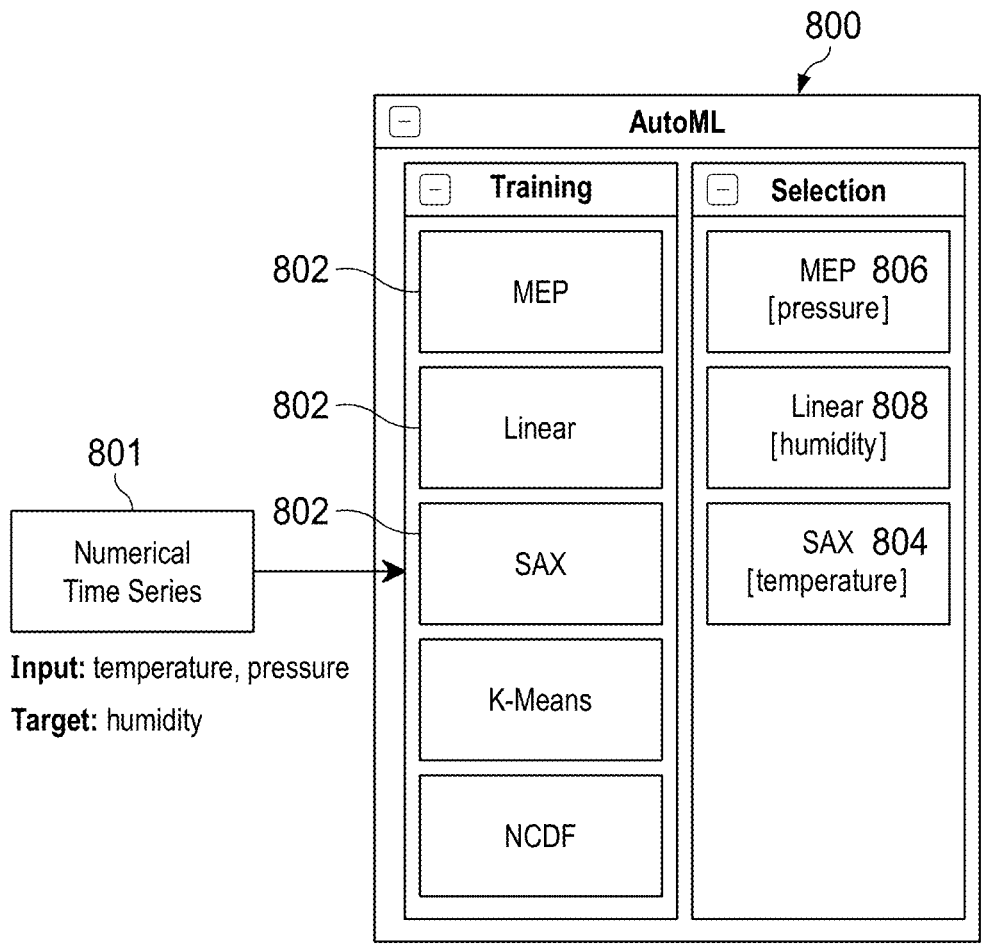
FIG. 8 depicts how an AutoML process may be used to apply per-domain symbolization techniques to different types of data output from a semiconductor manufacturing operation.

The simple use case depicted here is not intended to be limiting. Any numerical data set may be encoded according to a symbolization technique, and there is also no limit on the number of candidate partitioning locations that may be enforced. Also, a different symbolization technique (e.g., MEP, SAX, etc.) may be employed for a particular input data type, while some other technique is used for another data type. Generalizing, the particular performance of the symbolization techniques employed will vary depending on the specifics of the data constituting the time series and the domain. Because equipment used in the semiconductor industry has a high number of sensors, preferably AutoML (Automated Machine Learning, which are techniques that automate the selection, composition and parameterization of machine learning models) also is employed to identify a set of one or more (or an ensemble of) best symbolization techniques to use for a specific use case across different domains. AutoML as-a-service (managed AutoML) typically is available as a managed service in a cloud compute environment (e.g., Microsoft® Azure®, Amazon® AWS®, and the like). For example, FIG. 8 depicts a scenario wherein the AutoML 800 has a number of available symbolization techniques 802 such as described above. The AutoML 800 is configured to select best performing symbolization techniques to encode the numerical data 801 into symbols. In this example, which is not intended to be limiting, with temperature and pressure representing the input, SAX 804 is selected for temperature, while MEP 806 is selected for pressure. For the resulting target output (humidity), the AutoML selects linear partitioning 808 for the symbolization technique. Once again, these examples are not intended to be limiting, and there is no requirement that managed AutoML be used for this purpose, as the symbolization techniques may be carried out within the operating environment as depicted in FIG. 5.

Generalizing, and once the desired symbolization technique is determined for a particular time series data set (and applied), the resulting encoding scheme is then useful for fine-tuning the GLLM, and then using the model for inferencing. In this process, a method for process control in association with a semiconductor production system leverages a large language model that has been trained on production data, but in a manner that avoids or minimizes use of numerical data in the manner described above. In particular, during training (which includes fine-tuning the training of a pre-trained LLM), a large amount of training data from the production system is received. Typically, this data is of various types including historical sensor data (typically in a time series), text data of various types, and, optionally, human-generated additional data. The historical sensor data typically includes time series-based process data, metrology data, maintenance data, and the like. The text data may be received from various data sources, such as tool manuals, operation procedure documentation, end-of-shift reports, incident reports, process engineering frequently asked questions (FAQs), best practices documentation, on-boarding documentation, data schemas, and the like. The human-generated additional data may be of various types, such as human intelligence including, without limitation, a bespoke set of questions and answers created to fine-tune a response capability of the model for a particular customer or user. According to this disclosure, and in lieu of using the historical sensor data to train the model directly, that data is first encoded into a grammar-based sequence of characters before it is applied to train the model. As described in FIG. 6, typically the encoding is performed on a per-domain basis by receiving the time series data, performing symbolization to construct the symbol blocks (words), and encoding the resulting grammar, e.g., as a probabilistic state machine. Using the symbol block corpus, the time series numerical data is transformed into an appropriate character format, with the result then being used to train the model (or fine-tune the training of the pre-trained model, as the case may be). This same encoding is also later applied to any input data stream against which inferencing by the trained model is then carried out. Information returned from the inferencing will have the format of the symbolic representation, and the symbol block corpus is then used to decode the symbolic representation back into a numeric format.

The use of symbol-based representations reduces training time by leveraging the pre-trained capability of the GLLM, and it improves inferencing by clearly surfacing to the grammar domain the numeracy attributes of the sensor data. This provides significant advantages because the numbers received from the sensors often do not vary much (because of the microscopic precision required to produce high quality chips). In this operating context, known techniques (e.g., of processing natural language into tokens/embeddings) produce sub-optimal results because the embeddings for similar numbers will be very close and thus hard to distinguish by the pre-trained model, and further because a subtle change in a number may lead to totally different end results. The encoder/decoder approach herein provides significantly enhanced training and inferencing results.

Figure 9:
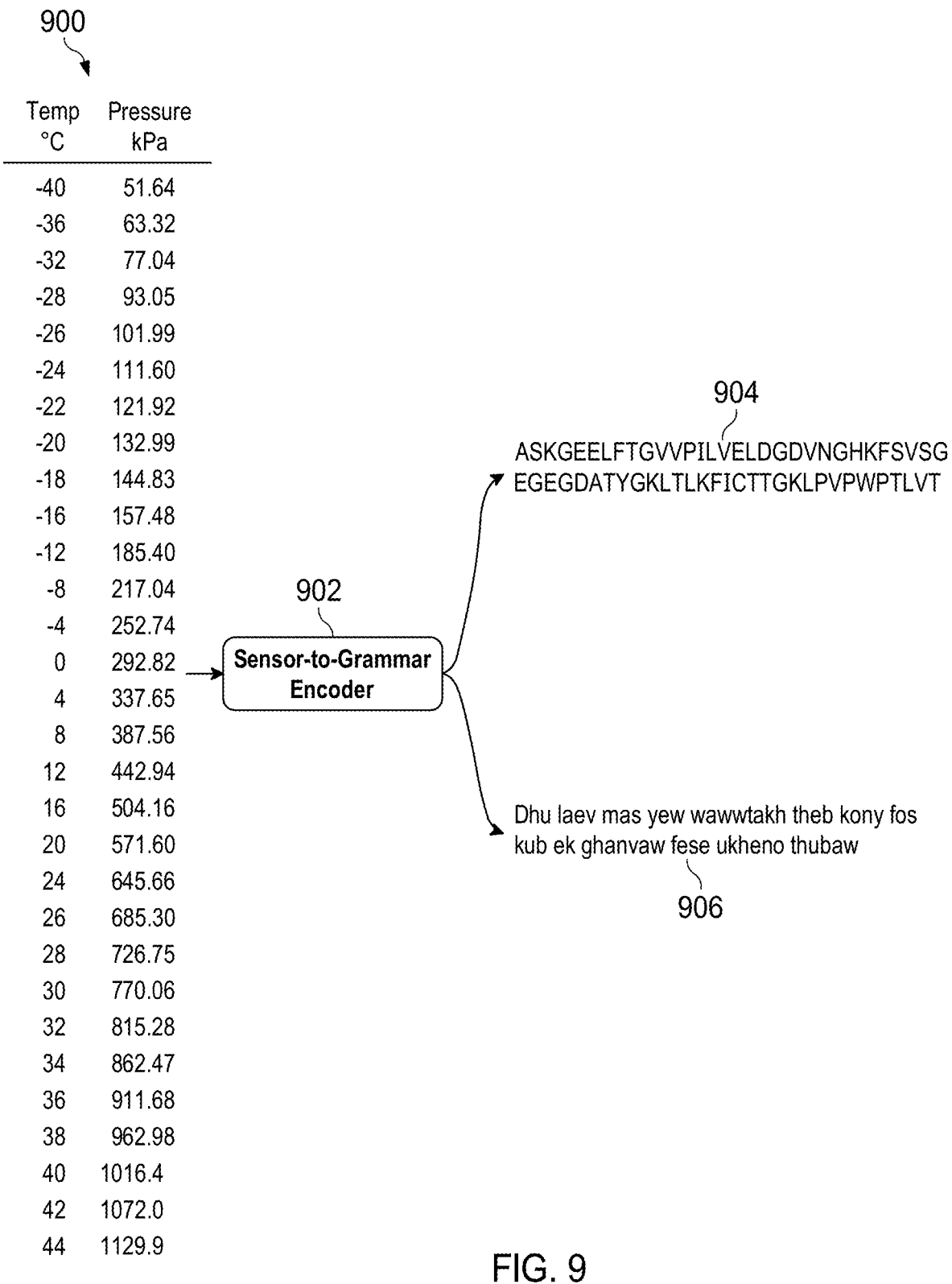
FIG. 9 depicts an operation of a sensor-to-grammar encoder of this disclosure.
Figure 10:
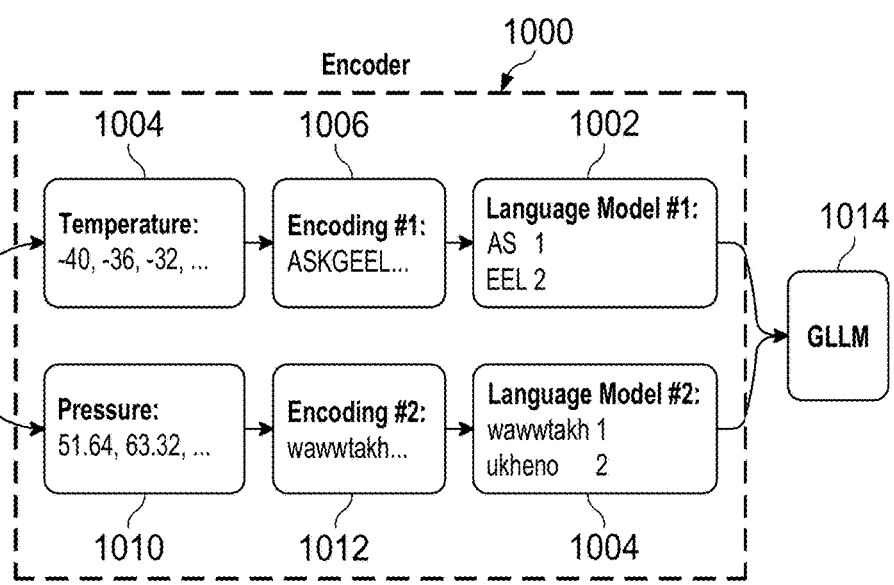
FIG. 10 depicts a per-domain encoding of sensor data.

FIG. 9 depicts a representative sensor-to-grammar encoder/decoder operation on numerical data, in the case a time series tabular data set 900 comprising temperature and pressure data. The sensor-to-grammar encoder 902 has been configured according to the process described in FIG. 6. Here, there is a symbol block corpus for temperature, and another symbol block corpus for pressure. The encoder 902 encodes the tabular sensor data as a grammar-based sequence of characters, in the case the sequence 904 for the temperature data, and the sequence 906 for the pressure data. FIG. 10 depicts this processing in additional detail. In FIG. 10, the encoder 1000 comprises separate pipelines for each domain (i.e., temperature, and pressure). In this example, each domain has an associated language model 1002 or 1004 that has been trained on data specific to that domain. Thus, the temperature input series 1006 is converted into the encoding 1008 (using the symbol block corpus associated with the temperature domain), and the resulting sequence then applied to the language model 1002 that is specific to that domain. Similarly, the pressure data input series 1010 is converted into the encoding 1012 (using the symbol block corpus associated with the pressure domain), and the resulting sequence then applied to the language model 1004. The resulting outputs then serve as the inputs to the GLLM 1014.

Figure 11:
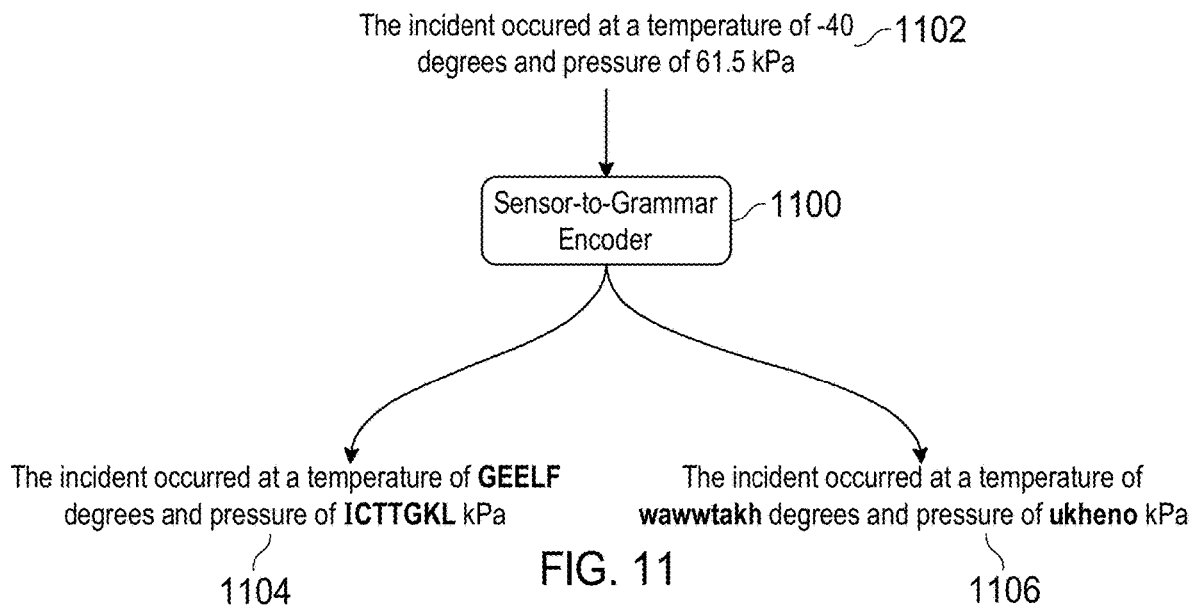
FIG. 11 depicts how the sensor-to-grammar encoder/decoder operation with respect to text that includes numerical data.

The approach herein is not limited to use with time series-based tabular data. FIG. 11 depicts a sensor-to-grammar encoder mechanism 1100 that encodes sensor data that is present in a text as a grammar-based sequence of characters. As depicted, the text 1102 includes both words and numerical data. In this example, which leverages the encoder in FIG. 10 (that has different models for each of the temperature and pressure domains), there are two encoded outputs. The first output 1104 represents the use of the temperature language model 1002, and the second output 1106 represents the use of the pressure language model 1004.

Figure 12:
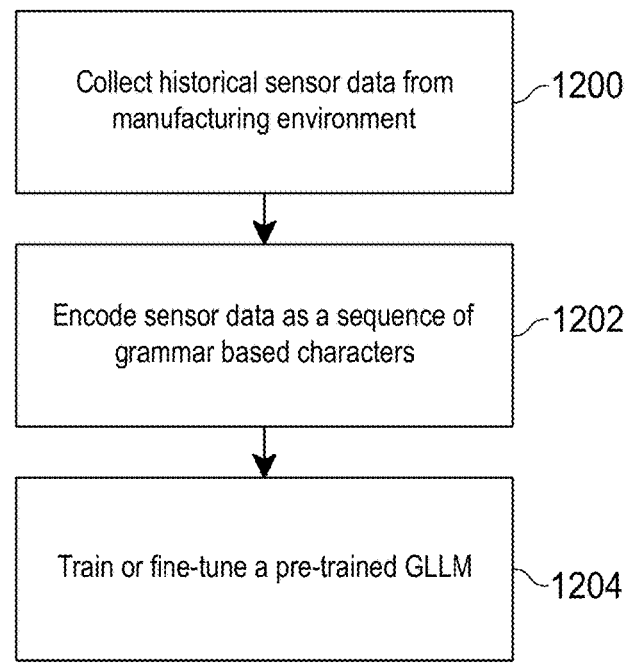
FIG. 12 depicts the high level training of a GLLM according to this disclosure.

Generalizing, FIG. 12 is a process flow depicting the training process. The process typically is implemented in software executed in hardware. The process begins at step 1200 by collecting historical sensor data from the manufacturing environment. At step 1202, the collected sensor data is encoded as a sequence of grammar-based characters, typically on a per domain basis. At step 1204, the transformed sensor data is then used to train or fine-tune a pre-trained GLLM.

Figure 13:
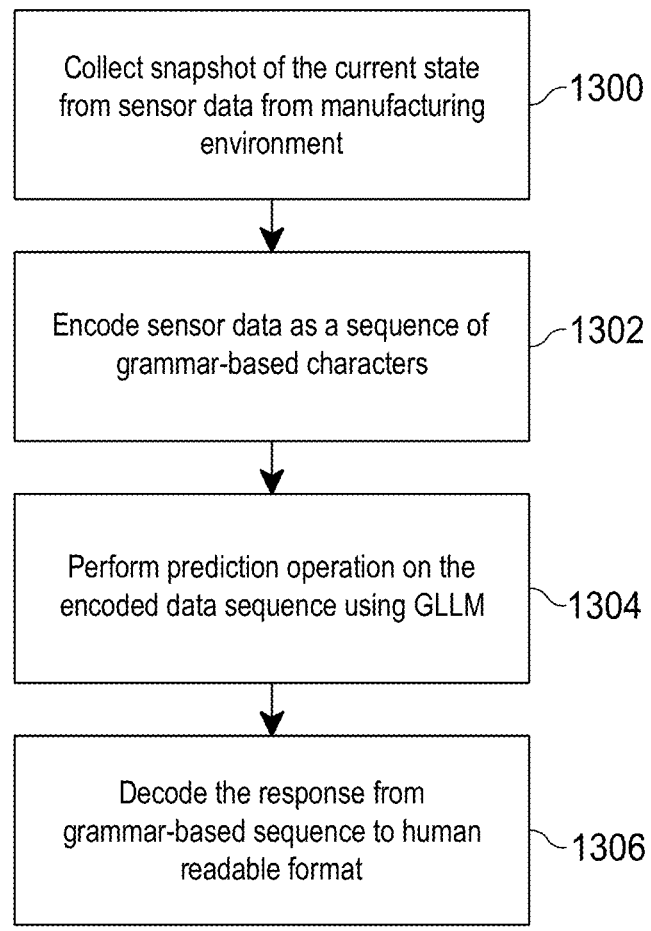
FIG. 13 depicts the GLLM in FIG. 12 used for inferencing in association with a semiconductor manufacturing facility system, device, process or tool.

Generalizing, FIG. 13 is a process flow depicting an inference process using the GLLM. At step 1300, a snapshot of a current state of a tool or process is collected from sensor data in the manufacturing environment. Using the (per-domain) encoder (based on the type of sensor data), at step 1302 the system encodes the sensor data as a sequence of grammar-based characters. Based at least in part on the encoded sensor data (the current state), the transformed data is applied through the GLLM, which then performs a prediction operation at step 1304. At step 1306, the response derived by the model from the grammar-based sequence is then decoded (against the appropriate per domain symbol block corpus) to a human-readable format.

Figure 14:
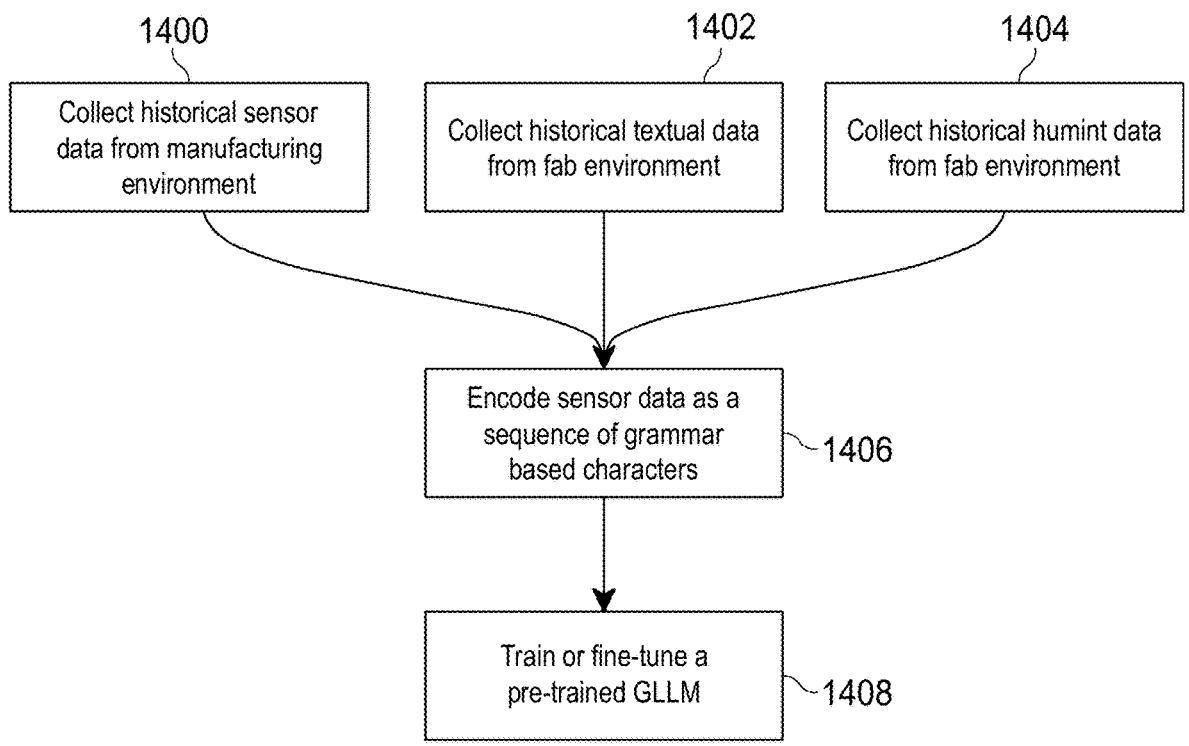
FIG. 14 depicts how cross-functional data sets may be used for training the GLLM

FIG. 14 depicts a preferred embodiment showing how the GLLM is trained on cross-functional data sets. In this embodiment, historical sensor data is collected from the manufacturing environment in step 1400. At 1402, historical textual data is collected from the environment. At 1404, historical human intelligence data is collected. These different types of data sources have been described above. To the extent any of the data sources include numerical data (typically sensor data), step 1406 encodes that data as a sequence of grammar-based characters. FIGS. 9-11 depicted examples of this processing. At step 1408, the output of the encoder is used to train or fine-train a pre-trained GLLM.

Figure 15:
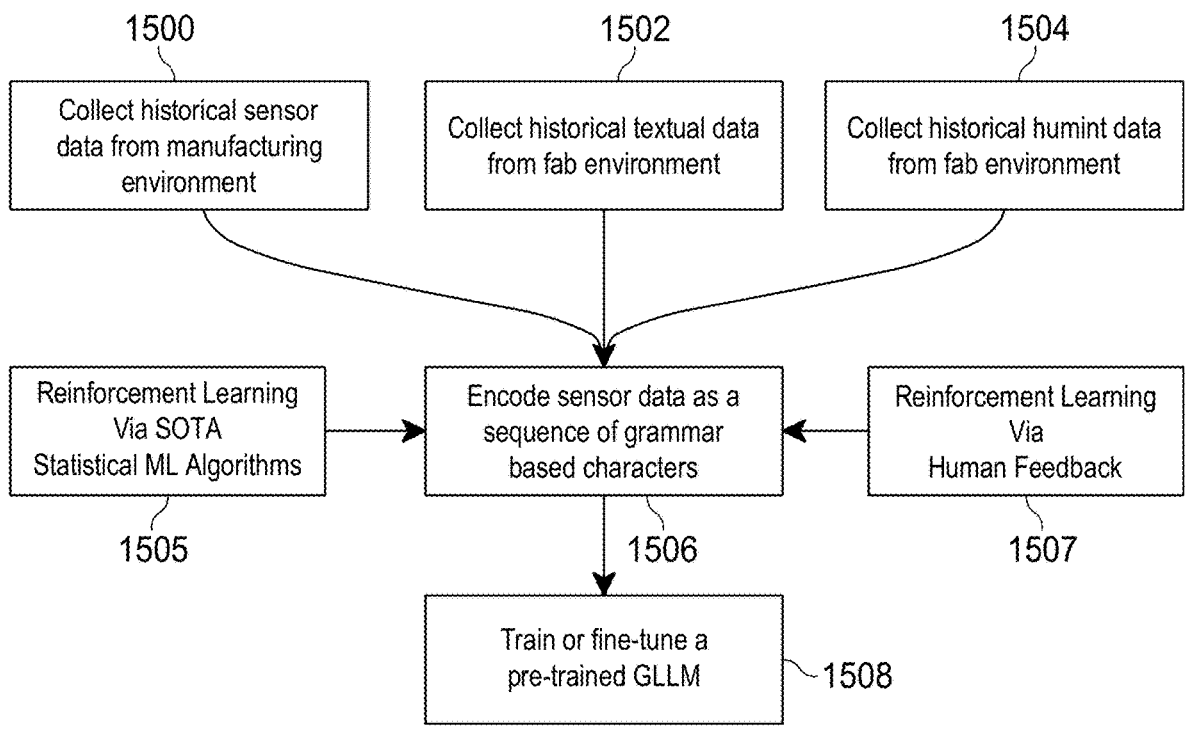
FIG. 15 depicts a variant embodiment wherein the cross-functional data sets are used in association with reinforcement learning techniques to train the GLLM.

FIG. 15 depicts a variant embodiment wherein the training process also leverages reinforcement learning. In this embodiment, once again the GLLM is trained on cross-functional data sets. In this embodiment, historical sensor data is collected from the manufacturing environment in step 1500. At 1502, historical textual data is collected from the environment. At 1504, historical human intelligence data is collected. These different types of data sources have been described above. To the extent any of the data sources include numerical data (typically sensor data), step 1506 encodes that data as a sequence of grammar-based characters. At step 1508, the output of the encoder is used to train or fine-train a pre-trained GLLM. So far, this operation is as described in FIG. 14. In this embodiment, two additional steps are carried out. At step 1505, reinforcement learning is applied using statistical modeling (e.g., state-of-the-art ML algorithms); similarly, at step 1507, reinforcement learning via human feedback is implemented. Reinforcement learning is applied during the training/fine-tuning of the GLLM.

Figure 16:
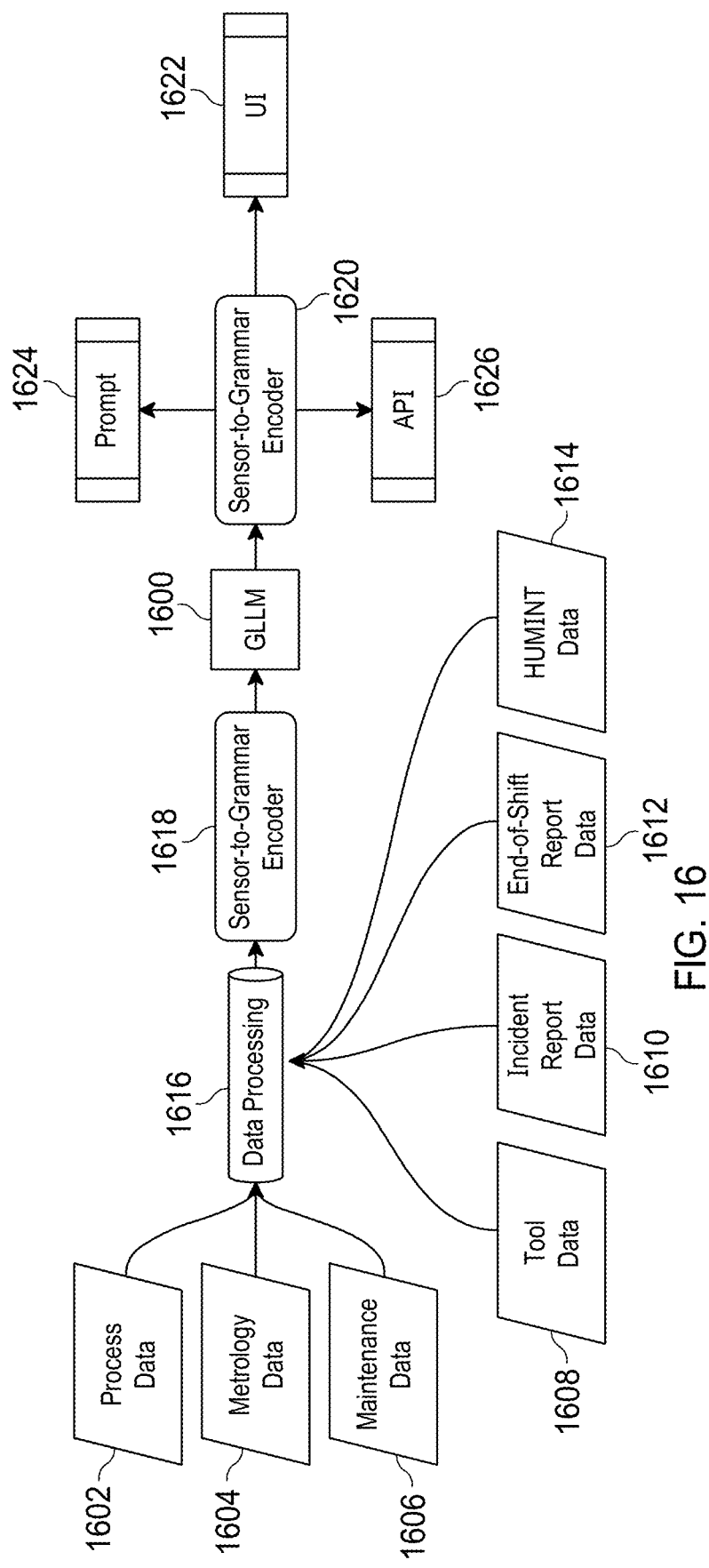
FIG. 16 depicts a meta-model system wherein the GLLM is trained and used for inferencing in association with multiple data types.

FIG. 16 depicts a representative implementation of the meta-modeling technique of this disclosure wherein a variety of data sources are available. In this example, GLLM 1600 is used for inferencing, and a sensor-to-grammar encoder 1618 together with a sensor-to-grammar decoder 1620 provide the above-described encoding/decoding operations. The production data comprises process data 1602, metrology data 1604, and maintenance data 1606. The text data comprises tool data 1608, incident report data 1610 and end-of-shift data 1612. The additional data comprises human intelligence data 1614 that may be domain-specific. Data processing 1616 provides normalization, filtering or other such operations to ensure that the data can be appropriately encoded by the sensor-to-grammar encoder 1618 as has been previously described. These data sets provide the raw data for training or fine-tuning the GLLM. For inferencing, the current state information is received by the system, typically via a prompt 1624, or via an application programming interface (API) 1626, and the prediction generated by the GLLM is output on the user interface (UI) 1622.

The approach herein provides significant advantages. The approach enables current state-of-the-art GLLMs to be adapted for use as meta-models for semiconductor use cases. By fine-tuning a pre-trained generative LLM on semiconductor datasets, the model can be used to provide predictions (and thus business value) across multiple personas in the semiconductor manufacturing environment. As has been described, the approach leverages a mechanism that encodes sensor data in a character format, which enables the GLLM to use its understanding of grammar structure to facilitate training and inferencing, e.g., on tabular data sets that otherwise comprise numeric sensor data. Further, the approach may leverage different encoding/decoding schemes, e.g., based on the grammar or character format that is best suited for the LLM, and the particular grammar or character format may vary one or more factors, such as scale, precision, domain and temporality. By maintaining the encoding/decoding operations as private and leveraging a third party GLLM provider, a semiconductor can preserve its proprietary information. In this scenario, grammar encoder/decoder rules are performed on a client side, thereby obfuscating the sensor data, while the training and inferencing are then performed on privacy-preserving inputs.

The above-described technique of converting numerical representations, e.g., into an alphabet-based sequence, allows the model to clearly represent scale, precision, domain, and temporality of attributes, as well as to differentiate more easily at the embedding level between them. Further, the symbol-based representation reduces training time by leveraging the pre-trained capability of the GLLM, and it improves inferencing by clearly surfacing to the grammar domain the numeracy attributes of the sensor data.

Enabling Technologies

Typically, the predictive operating system of this disclosure is managed and operated "as-a-service" by a service provider entity. In one embodiment, a computing platform on which the predictive operating system executes is accessible over the publicly-routed Internet at a particular domain, or sub-domain. The platform is a securely-connected infrastructure (typically via SSL/TLS connections), and that infrastructure includes data encrypted at rest, e.g., in an encrypted database, and in transit. The computing platform typically comprises a set of applications implemented as network-accessible services. One or more applications (services) may be combined with one another. An application (service) may be implemented using a set of computing resources that are co-located or themselves distributed. Typically, an application is implemented using one or more computing systems. The computing platform (or portions thereof) may be implemented in a dedicated environment, in an on-premises manner, as a cloud-based architecture, or some hybrid. Although typically the platform is network-accessible, e.g., via the publicly-routed Internet, the computing system may be implemented in a standalone or on-premises manner. In addition, one or more of the identified components may interoperate with some other enterprise computing system or application.

One or more functions of the computing platform of this disclosure may be implemented in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (Saas) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the machine learning techniques described herein are provided using a set of one or more computing-related entities (systems, machines, processes, programs, libraries, functions, or the like) that together facilitate or provide the described functionality. In a typical implementation, a representative machine on which the software executes comprises commodity hardware, an operating system, an application runtime environment, and a set of applications or processes and associated data, which provide the functionality of a given system or subsystem. As described, the functionality may be implemented in a standalone machine, or across a distributed set of machines.

The techniques herein provide for improvements to another technology or technical field, i.e., semiconductor production manufacturing. As has been described, the techniques find specific practical application in improving operations associated with production machines and their associated workflows in advanced fabrication facilities, typically wherein production is completely automated and carried out in a hermetically sealed nitrogen environment to improve yield (the percent of microchips that function correctly in a wafer), with automated material handling systems used to transport wafers from machine to machine. The modeling and prediction techniques also provide for improvements to the operations of particular production machines, all as has been described above.

What I claim is as follows:

1. A method, comprising:
   fine-tuning a large language model (LLM) to infer a meaning of one or more temporal state transitions occurring in association with a semiconductor manufacturing environment, the LLM having been pre-trained to recognize a grammatical structure, the LLM fine-tuned into a fine-tuned LLM by:

for each of one or more domains associated with the semiconductor manufacturing environment:
receiving a historical data set, the historical data set comprising a time series of numeric data associated with a sensor or sensor type;
based on a range of the numeric data as determined empirically or via domain knowledge, defining a set of symbols constituting an alphabet;
partitioning the set of symbols into a partitioned set of symbols, wherein a particular symbol sequence in the partitioned set of symbols retains a meaning of a temporal state transition behavior embedded in the time series;
based on the partitioned set of symbols, constructing a set of symbol blocks; and
using the set of symbol blocks, converting the time series of numeric data into a sequence of characters whose character format is consistent with the grammatical structure; and
training the LLM to infer the meaning of the temporal state transition behavior using the sequence of characters in lieu of the numeric data; and after fine-tuning the LLM, using the fine-tuned LLM to generate a prediction of the meaning of the temporal state transition behavior associated with a set of new numeric data associated with the semiconductor manufacturing environment; and controlling an automated tool or process in the semiconductor manufacturing environment based at least in part on the prediction.

2. The method as described in claim 1, wherein the LLM is a generative large language model (GLLM).

3. The method as described in claim 1, further including encoding the grammatical structure as a probabilistic state machine and storing a corpus of the set of symbol blocks.

4. The method as described in claim 1, wherein one of the domains is a different time series.

5. The method as described in claim 1, wherein the partitioning and constructing operations are implemented using a symbolic partitioning algorithm that is one of: maximum entropy partitioning, uniform space partitioning, frequency domain interval class, and symbolic aggregate approximation.

6. The method as described in claim 1, wherein the partitioning and constructing operations associated with a first domain of the set of domains utilize a first symbolic approximation algorithm, and wherein the partitioning and construction operations associated with a second domain of the set of domains utilize a second symbolic approximation algorithm, and wherein the first and second symbolic approximation algorithms differ from one another.

7. The method as described in claim 1, wherein fine-tuning the LLM includes applying one of: text data, text data that includes a numeric value, and additional data.

8. The method as described in claim 7, wherein the additional data is human intelligence data that is associated with the LLM.

9. The method as described in claim 1, wherein the fine-tuning is carried out in the semiconductor manufacturing environment to preserve privacy of the historical data set.

10. The method as described in claim 1, further including augmenting the fine-tuning of the LLM using reinforcement learning.

11. The method as described in claim 1, wherein the prediction comprises a symbolic representation that conforms to the grammatical structure.

12. The method as described in claim 11, further including applying an encoder/decoder to the prediction to recover information that includes at least some of the additional numeric data.

13. The method as described in claim 1, wherein the prediction occurs remotely from the semiconductor manufacturing environment.

14. An apparatus, comprising
one or more hardware processors; and
computer memory holding computer program code executed by the one or more hardware processors to provide process control in association with a semiconductor manufacturing environment, the computer program code comprising computer program instructions configured to:

fine-tune a large language model (LLM) to infer a meaning of one or more temporal state transitions occurring in association with a sensor or sensor type in the semiconductor manufacturing environment, the LLM having been pre-trained to recognize a grammatical structure, the LLM fine-tuned into a fine-tuned LLM by (i) receiving a time series of numeric data, (ii) based on a range of the numeric data as determined empirically or via domain knowledge, defining a set of symbols constituting an alphabet, (iii) partitioning the set of symbols into a partitioned set of symbols, wherein a particular symbol sequence in the partitioned set of symbols retains a meaning of a temporal state transition behavior embedded in the time series, (iv) based on the partitioned set of symbols, constructing a set of symbol blocks, (v) using the set of symbol blocks, converting the time series of numeric data into a sequence of characters whose character format is consistent with the grammatical structure, and (vi) training the LLM to infer the meaning of the temporal state transition behavior using the sequence of characters in lieu of the numeric data;

use the fine-tuned LLM to generate a prediction of the meaning of the temporal state transition behavior associated with a set of new numeric data associated with the semiconductor manufacturing environment; and control an automated tool or process in the semiconductor manufacturing environment based at least in part on the prediction.

15. The apparatus as described in claim 14, wherein the prediction comprises a symbolic representation that conforms to the grammatical structure, and wherein the computer program instructions are further configured to decode the prediction and recover information that includes at least some of the additional numeric data.

* * * * *